US007668525B2

(12) United States Patent
Shatara et al.

(10) Patent No.: US 7,668,525 B2
(45) Date of Patent: Feb. 23, 2010

(54) SYSTEM AND METHOD OF A STEREO RECEIVING SYSTEM

(75) Inventors: Raed S. Shatara, Carmel, IN (US); Jeffrey J. Marrah, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 525 days.

(21) Appl. No.: 11/712,719

(22) Filed: Mar. 1, 2007

(65) Prior Publication Data

US 2008/0214133 A1 Sep. 4, 2008

(51) Int. Cl.
*H04B 1/06* (2006.01)

(52) U.S. Cl. .................................... 455/276.1; 455/304

(58) Field of Classification Search ....................... None
See application file for complete search history.

(56) References Cited

U.S. PATENT DOCUMENTS 5,517,686 A 5/1996 Kennedy et al.
6,044,254 A * 3/2000 Ohta et al. .................. 455/272
6,389,085 B1 * 5/2002 Salt ............................ 375/347
2002/0146994 A1 * 10/2002 Marrah et al. ............ 455/276.1

* cited by examiner

*Primary Examiner*—Thanh C Le
(74) *Attorney, Agent, or Firm*—Jimmy L. Funke

(57) ABSTRACT

A system and method of a stereo receiving system, including a plurality of antennas, a receiving device, a plurality of summing devices, a phase lock loop device, a controllable phase shifter device, and a gain-control device. The plurality of antennas receive RF signals having a common frequency but potentially different phases. The receiving device is in electrical communication with the plurality of antennas. The plurality of summing devices are in electrical communication between at least one of the plurality of antennas and the receiving device. The phase lock loop device is in electrical communication with the receiving device. The gain-control device is in electrical communication between the plurality of antennas and the receiving device, wherein the gain-control device controls a signal-to-noise ratio of the RF signals aligned from the plurality of antennas.

20 Claims, 3 Drawing Sheets

SYSTEM AND METHOD OF A STEREO RECEIVING SYSTEM

TECHNICAL FIELD

The present invention generally relates to a stereo receiving system.

BACKGROUND OF THE INVENTION

Vehicles are typically equipped with an antenna for receiving radio signals. One example of such an antenna is a mast antenna, which extends from the exterior body of the vehicle. However, the mast antenna is generally susceptible to interfering with the desired styling of the vehicle, being damaged when the vehicle passes under a low clearance object, acts of vandalism, accident with another vehicle or object, and has limitations in the terms of its reception quality.

An alternative to the mast antenna is placing the antenna within the vehicle's glass, such as a windshield. Whether the single antenna is a mast antenna, an in-glass antenna, or other type of antenna, a single antenna typically has inherent limitations, such as fading and multipath signal interference resulting from an obstruction, which can be caused by the presence of a building, a mountain, another vehicle, or the like. Further, the in-glass antennas are typically more susceptible to fading and multipath signal interference due to their gain, their directivity, and their polarization properties. There have been several techniques developed using multiple antennas for receiving radio signals to reduce the affects of such fading and interference. These techniques include scanning/selection or switching diversity, equal-gain combining, and maximal-ratio combining. The scanning/selection or switching diversity technique is one that operates on the premise that if one antenna disposed on the vehicle is receiving a poor signal, another antenna spaced from the first antenna may be receiving a better signal. Thus, only one antenna is used for receiving the signal at any particular point in time. The system either compares the signals that are being received by the system's antennas to ascertain which antenna is receiving the better quality signal, or the system evaluates the signal being received by a single antenna to determine a quality of the signal and simply switches to another antenna if the current signal is designated as unacceptable. However, the switching transients caused by switching between antennas can be audible under some circumstances, and since only one antenna is typically used at any point in time, the system may provide only marginal improvement during fringe reception when compared to single antenna systems.

The equal-gain combining technique combines signals received by the antennas in an antenna array by correcting for the phase differences between antennas, then adding the signals pictorially. No adjustments are made to the signals for any difference in the gains of the input signals because only the phases of the input signals are adjusted for alignment in an equal-gain system. However, it is possible that the signal-to-noise ratio may be less than optimal. For example, if two inputs are combined, and one of those inputs contains mostly noise, the combined signal is likely to be of lower quality than the single non-corrected signal. In such a situation, it would have been ideal to use only the signal from the antenna that was not mostly noise.

Another technique is the maximal-ratio combining technique. In the maximal-ratio combining technique, the input signals are adjusted according to the detected phase thereof, the magnitudes of the input signals are adjusted according to the detected phase thereof, and the magnitudes of the input signals are adjusted to yield the maximum signal-to-noise ratio. Thus, a signal that is corrupted with noise does not degrade the overall performance of the system. However, the maximal-ratio combining technique is generally very complex, typically, due to the hardware having multiple receivers plus the combined algorithm for combining the multiple signals. Additionally, the cost of implementing such a system can be prohibitive in some environments.

In the early 1960s, an equal-gain combining technique was developed that permitted phase alignment at the radio frequency (RF) Lewin, "Diversity Reception and Automatic Phase Correction" (Proc. of IEEE, Paper No. 3584E, Vol. 9, Part B., No. 46, pp. 295-304, July 1962). In Lewin, a phase changer was disclosed for use in an adaptive system. The phase changer both sensed and corrected the phase of the signal. Specifically, phase perturbation is introduced, and the resulting amplitude modulation is detected. Based on the work of Lewin, others developed similar techniques for amplitude modulated (AM) receivers (Parsons et al., "Space Diversity Reception for VHF Mobile Radio," Electronic Letters, Vol. 7, No. 22, pp. 655-56, Nov. 4, 1971). For frequency modulated (FM) receivers, a related technique was developed (Parsons et al., "Self-Phasing Aerial Array for FM Communication Links," Electronic Letters, Vol. 7, No. 13, pp. 380-81, Jul. 1, 1971). In the system described in Parsons, amplitude perturbation is introduced, which results in phase modulated components of the sum signal, which are proportional to the relative phases of the input signals. This phase perturbation is then detected and used in a feedback loop to control phase shifters and bring the input signals into phase alignment. The perturbation frequency must be outside the modulation bandwidth to avoid interference with a legitimate FM signal.

Further, the above systems generally lack gain-control of the antenna signals to optimize the signal-to-noise ratio of the output. The signal-to-noise ratio is a comparison of the power of the signal to the power of the noise. By not controlling the gain of the system, the power of the output of the system can be at an undesirable proportion to the power of the input of the system, which can result in an undesirable signal-to-noise ratio.

Therefore, it is desirable to develop a stereo receiving system and method that aligns the phases of the RF signals received by the multiple antennas and includes a gain-control loop for optimizing the signal-to-noise ratio.

SUMMARY OF THE INVENTION

One embodiment of the present invention relates to a stereo receiving system that comprises a plurality of antennas, a receiving device, a plurality of summing devices, a phase lock loop device, a controllable phase shifter device, and a gain-control device. The plurality of antennas receive a plurality of radio frequency (RF) signals having a common frequency, but potentially different phases. The receiving device has at least an amplitude modulated (AM) detector output, a frequency modulated (FM) detector output, and the receiving device is in electrical communication with the plurality of antennas. The plurality of summing devices are in electrical communication between at least one of the plurality of antennas and the receiving device. The FM detector output includes a pilot signal. The phase lock loop device is in electrical communication with the receiving device, locks onto the pilot signal, and provides a perturbation frequency signal. The controllable phase shifter device is in electrical communication between at least one of the plurality of antennas and at least one of the plurality of summing devices. The controllable phase shifter device is responsive to at least the FM detector output and shifts the phase of at least one of the plurality of RF signals by an amount sufficient to eliminate a phase error between the received plurality of RF signals. The gain-control device is in electrical communication between the plurality of antennas and the receiving device, and controls a signal-to-noise ratio of the RF signals aligned from the plurality of antennas.

Another embodiment of the present invention relates to a stereo receiving system comprising at least a first antenna and a second antenna, a receiving device, at least a first summing device and a second summing device, a phase lock loop device, a controllable phase shifter device, at least a first AM modulator and a second AM modulator, a synchronous detector, a gain-control integrator, and a potentiometer device. The first antenna has a first RF signal and the second antenna has a second RF signal, wherein the first and second RF signals have a common frequency, but potentially different phases. The receiving device has at least an AM detector output and an FM detector output. The receiving device is in electrical communication with the first and second antennas. The first summing device is in electrical communication between the first antenna and the receiving device. The second summing device is in electrical communication between the second antenna and the receiving device. The FM detector output includes a pilot signal. The phase lock loop device is in electrical communication with the receiving device, locks onto the pilot signal, and provides a perturbation frequency signal. The controllable phase shifter device is in electrical communication between the first and second antennas and the first and second summing devices. The controllable phase shifter device is responsive to the FM detector output and shifts the phase of at least one of the RF signals by an amount sufficient to eliminate a phase error between the first and second RF signals. The synchronous detector is in electrical communication with the receiving device and multiplies the perturbation frequency signal by the AM output. The gain-control integrator integrates an output from the synchronous detector. The potentiometer device receives outputs from the first and second summing devices and biases an output signal towards one of the RF signals based upon the magnitude difference between the RF signals of the first and second antennas.

In yet another embodiment, the present invention relates to a method for receiving signals for a stereo system comprising the steps of receiving a plurality of RF signals from a plurality of antennas. A plurality of AM modulators are provided that receive the plurality of RF signals from the plurality of antennas. The method also provides a plurality of summing devices that receive the AM modulated signals from the AM modulators and sum the RF signals and the AM modulated signals. The outputs from the plurality of summing devices are received by a potentiometer device that biases an output signal towards one of the plurality of RF signals based upon a magnitude difference between the plurality of RF signals. The output signal from the potentiometer device is received by a receiving device. The receiving device has at least an AM modulated detector output and an FM modulated detector output that includes a pilot signal that is based upon the signal received from the potentiometer device. A phase lock loop device receives and locks onto the pilot signal, and provides a perturbation frequency signal. The perturbation frequency signal is multiplied by the AM output signal of the receiving device by the synchronous detector. An output of the synchronous detector is integrated by a gain-control integrator. The phase of at least one of the RF signals is shifted by an amount sufficient to eliminate a phase error between the RF signals by the controllable phase shifter device.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figures 1, 2A, 2B:
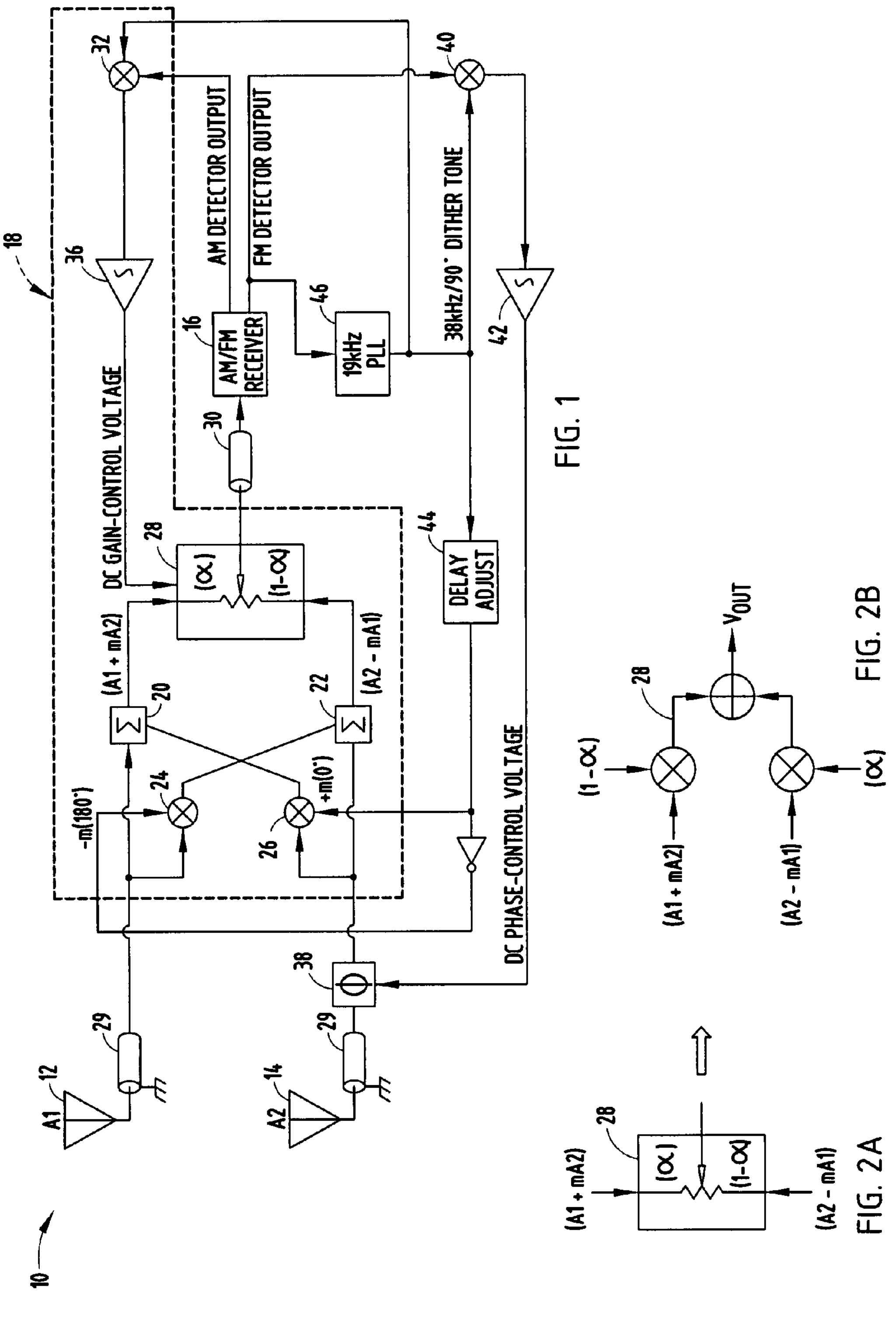
FIG. 1 is a circuit diagram of a stereo receiving system comprising a gain-control channel in accordance with an embodiment of the present invention.
FIG. 2A is a circuit diagram of a potentiometer device in accordance with an embodiment of the present invention.
FIG. 2B is a circuit diagram of a potentiometer device in accordance with an alternate embodiment of the present invention.

In reference to FIG. 1, a stereo receiving system is generally shown at reference indicator 10. The stereo receiving system 10 comprises a plurality of antennas including at least a first antenna 12 and a second antenna 14. The first and second antennas 12,14 receive radio frequency (RF) signals, which have a common frequency, but potentially different phases. A receiving device 16 is in electrical communication with the first and second antennas 12,14. The receiving device 16 typically has at least an AM detector output and an FM detector output that includes a pilot signal. Typically, the stereo receiving system 10 is an FM stereo receiving system, compatible with an FM stereo receiving system, or the like.

A gain-control device is generally indicated at reference indicator 18, and is in electrical communication between the first and second antennas 12,14 and the receiving device 16. The gain-control device 18 controls a signal-to-noise ratio of the RF signals aligned from the first and second antennas 12, 14, as described in greater detail below. The gain-control device 18 comprises a plurality of summing devices, including at least a first summing device 20 and a second summing device 22, a plurality of AM modulators, including at least a first AM modulator 24 and a second AM modulator 26, and a potentiometer device 28.

Typically, the first RF signal from the first antenna 12 is received by the first summing device 20 and the first AM modulator 24.

Similarly, the second RF signal from the second antenna 14 is received by the second summing device 22 and the second AM modulator 26. Thus, the first summing device 20 receives the first RF signal and the output of the second AM modulator 26, and the second summing device 22 receives the second RF signal and the output of the first AM modulator 24. By way of explanation and not limitation, the RF signals received from the antennas 12, 14 by the AM modulators 24,26 are modulated by a small AM index m. The first RF signal from the first antenna 12 is modulated with −m or 180 degrees relative to m, and the second RF signal from the second antenna 14 is modulated by the second AM modulator by m. It should be appreciated that any suitable filter 29 can be in electrical communication between the antennas 12, 14 and the gain-control device 18 for filtering undesirable noise from the RF signals.

The outputs from the summing devices 20, 22 are received by the potentiometer device 28. Typically, the parameters of the potentiometer device are α and 1−α. By having these parameters and AM modulating the signals from the first and second antennas 12, 14 by the small AM index, the receiving system 10 will maintain a lock on the signals, even when one of the antennas 12, 14 is in a null. The receiving system 10 can maintain lock on the signals due to the perturbation frequency signal, as described in greater detail below.

Further, by AM modulating the signals from the antennas 12, 14 by a small m index, the potentiometer device 28 biases an output signal towards the signal with the greater magnitude. The potentiometer device 28 compares the amplitudes of the RF signals from the antennas 12, 14 after the AM modulation of the RF signals. Thus, if the signals from the antennas 12, 14 are represented as vectors and have the same amplitude, the AM modulation signal, or m, will cancel out of both of the first and second RF signals, and it will be determined that the signals from the antennas 12, 14 are equal to one another. Alternatively, if the signals from the antennas 12, 14 are represented by vectors and have different amplitudes, the AM modulated signal at zero degrees or 180 degrees (m or −m), which is left after the comparison, is the RF signal with the greater amplitude, and thus, the desirable signal for the potentiometer device 28 to bias the output towards. This results in the potentiometer device 28 emitting an output signal that is biased towards the signal of the greater magnitude from the above comparison or based upon the magnitude difference of the signals. Therefore, both the first and second RF signals are used in the output, but the RF signal with the greater magnitude is emphasized to increase the quality of the output signal of the system 10. Thus, the potentiometer device 28 is not a potentiometer in the sense that it has a variable resistance in order to alter the output, but is a potentiometer device because the output is changing based upon the comparison of the inputs in order to bias the output towards the RF signal with the greater amplitude. Therefore, the potentiometer device 28 is a "potentiometer" because it has a varying output, where the varying output is biased towards the RF signal that has the greater magnitude.

Referring to FIGS. 1-2B, the parameters (α and 1−α) of the potentiometer device 28 related to the amplitudes of the first RF signal (A1) from the first antenna 12 and the second RF signal (A2) from the second antenna 14 may be defined by the following equations, respectively:

$$\alpha = \frac{A2}{A1 + A2}$$

and $$1 - \alpha = \frac{A1}{A1 + A2}$$

Using the above equations, when A1>A2 then α<(1−α) and the output of the potentiometer device 28 is biased towards signal A1, since signal A1 has the greater amplitude and thus the greater magnitude. Similarly, when A1<A2 then α>(1−α) and the output of the potentiometer device 28 is biased towards signal A2, since signal A2 has the greater amplitude and thus the greater magnitude. This is represented in both FIGS. 2A and 2B, which show equivalent schematic models of the potentiometer device 28.

The output of the potentiometer device 28 can then pass through a suitable filter 30 and be received by the receiving device 16. Receiving device 16 demodulates both the AM and FM information present on the output of the potentiometer device 28. The AM information is provided in the AM detector output. The FM information is provided in the FM detector output.

As part of the phase alignment of the signals, a pilot signal is emitted from the receiving device 16, which is part of the FM detector output.

The AM modulated detector output is received by a synchronous detector or multiplier 32. The synchronous detector 32 also receives a perturbation frequency signal from a phase lock loop (PLL) device 46. The phase lock loop device 46 is in electrical communication with the receiving device 16, locks onto the pilot signal, and provides or emits a perturbation frequency signal. By way of explanation and not limitation, the phase lock loop device 46 locks onto a 19 kHz signal and provides a 38 kHz/90 degrees perturbation frequency signal. The synchronous detector 32 multiplies the AM modulated detector output signal and the perturbation frequency output signal, and transmits an output to a gain-control integrator 36. The output of the gain-control integrator 36 is received by the potentiometer device 28, thus, forming a feedback loop to control the gain and the signal-to-noise ratio of the receiving system 10.

Further, the receiving system 10 aligns the phases of all of the RF signals received by the receiving system 10. Typically, a controllable phase shifting device 38 is in electrical communication between the second antenna 14, the second summing device 22, and second AM modulator 26. The controllable phase shifter device 38 is responsive to the FM detector output of the receiving device 16, and shifts the phase of the RF signal by an amount sufficient to eliminate a phase error between the RF signals received by the first and second antennas 12, 14. Further, the FM detector output is received by a multiplier or synchronous detector 40. The synchronous detector 40 multiplies the FM detector output signal by the perturbation frequency output from the phase lock loop device 46. The output from the synchronous detector 40 is received by an integrator 42, where the output of the integrator 42 is received by the controllable phase shifter device 38, thus, completing a loop that nulls the phase difference between the two received signals. An output voltage from the integrator 42 is received by the potentiometer device 28 and is used for determining which RF signal the output of the potentiometer device 28 is biasing towards.

Additionally, a delay-adjusting device 44 is in electrical communication between the second AM modulator 26 and the synchronous detector 40 in order to compensate for delays caused by the receiving device 16. Thus, the output of the delay device 44 is received by the second AM modulator, and an inverse of the output of the delay device 44 is received by the first AM modulator 24. It should be appreciated that in other embodiments the delay-adjusting device 44 would not be needed if the receiving device 16 could function without internal delays. The above elements set forth for aligning the phase of all of the RF signals received by the system 10 are described in U.S. Pat. No. 5,517,686 issued to Kennedy et al., entitled "DIVERSITY RECEIVER FOR FM STEREO UTILIZING A PILOT TONE MULTIPLE FOR PHASE ALIGNMENT OF RECEIVED SIGNALS." The entire disclosure of the aforementioned patent is hereby incorporated herein by reference.

Figure 3A:
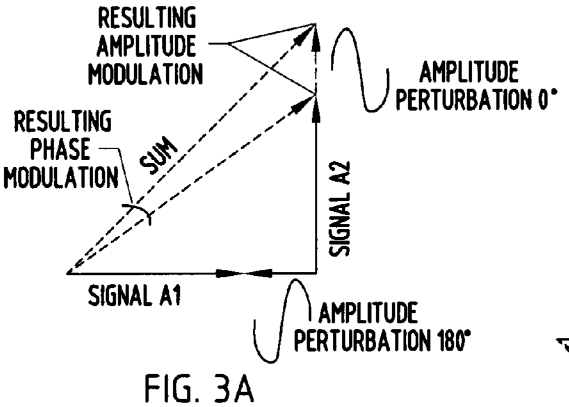
FIG. 3A is a vector diagram of the combination of two FM signals depicting the phase relation between the individual antennas and the sum of the RF signals, where signal A2 leads signal A1 in accordance with an embodiment of the present invention.
Figure 3B:
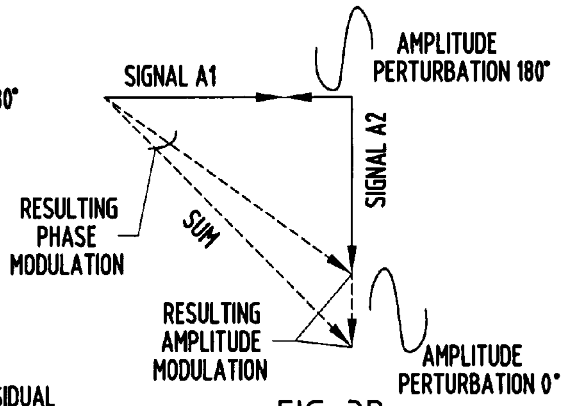
FIG. 3B is a vector diagram of the combination of two FM signals depicting the phase relation between the individual antennas and the sum of the RF signals, where signal A2 lags signal A1 in accordance with an embodiment of the present invention.
Figure 3C:
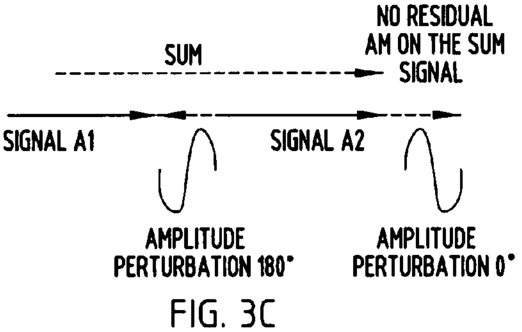
FIG. 3C is a vector diagram of the combination of two FM signals that are phase-aligned and have equal amplitudes in accordance with an embodiment of the present invention.

In reference to FIGS. 3A-3E, the signals received by the receiving system 10 are shown as vector diagrams. In both FIGS. 3A and 3B, the magnitude of the RF signals received from the first and second antennas 12, 14 are equal (A1=A2). In FIG. 3A, the signal from the second antenna 14 leads the signal from the first antenna 12, and in FIG. 3B, the signal from the second antenna 14 lags the signal from the first antenna 12. In FIG. 3C, the magnitude of the signals received from the first and second antennas 12, 14 are equal (A1=A2), and the phase of the signals are aligned. Since A1=A2, the signals have the same amplitude and the AM modulation (m and −m) are canceled out by one another.

Figure 3D:
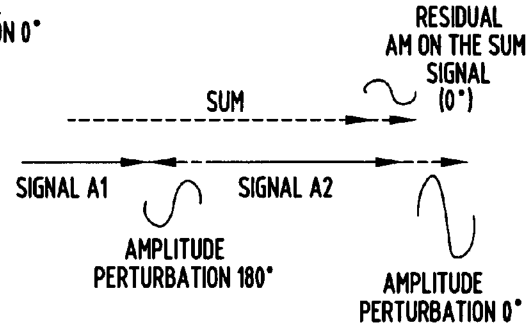
FIG. 3D is a vector diagram of the combination of two FM signals that have unequal amplitudes, where the signals are aligned in accordance with an embodiment of the present invention.
Figure 3E:
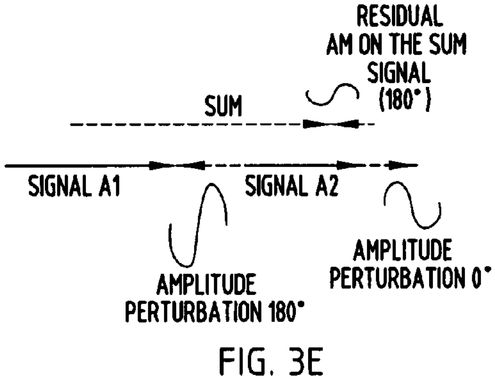
FIG. 3E is a vector diagram of the combination of two FM signals, where the two signals have unequal amplitudes and the perturbation frequency is in the sum of the signal so that the sum will be biased towards the signal with the greater magnitude in accordance with an embodiment of the present invention.
Figure 4:
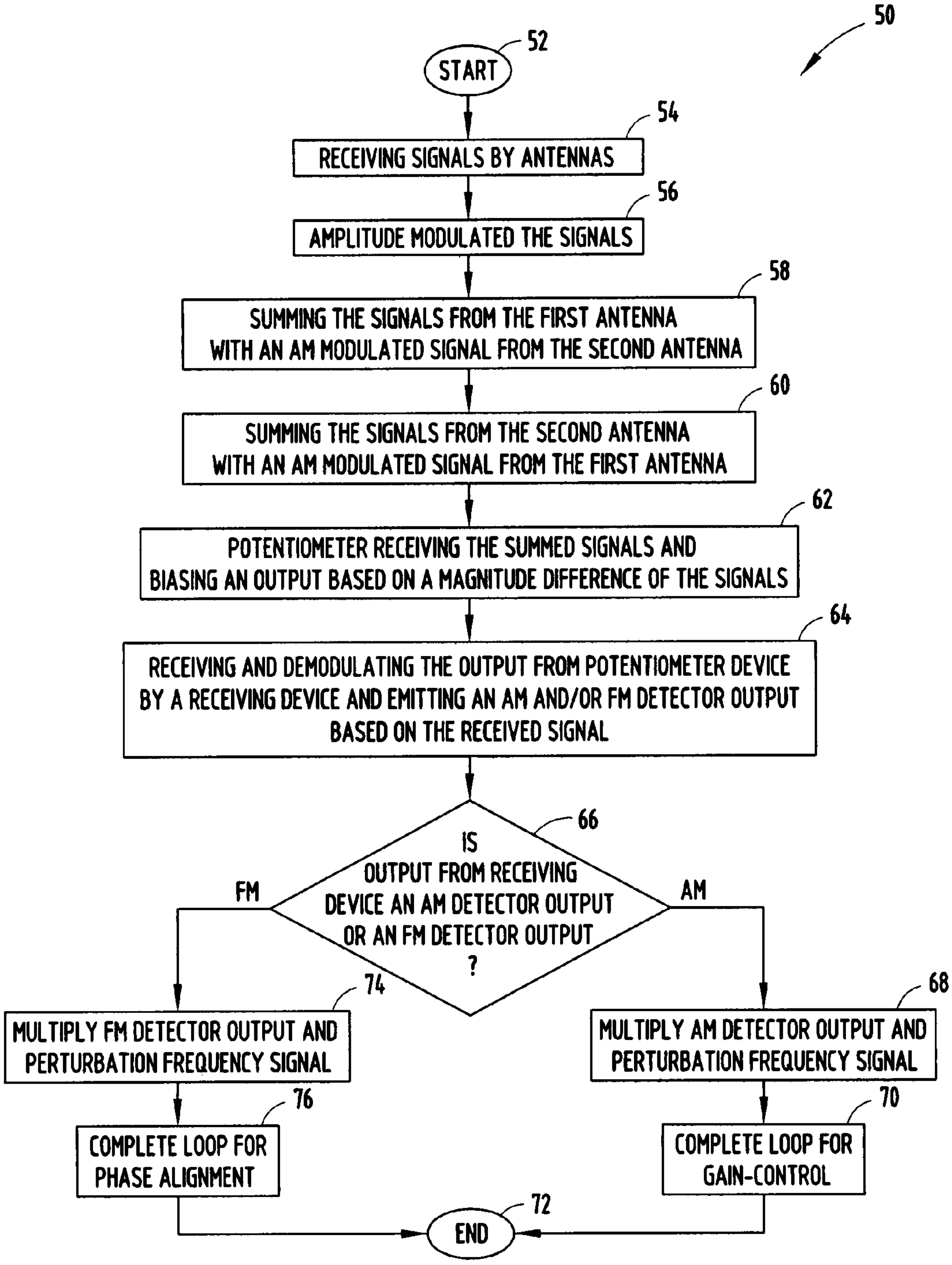
FIG. 4 is a flow chart depicting a method for receiving signals in a stereo receiving system comprising a gain-control channel in accordance with an embodiment of the present invention.

As shown in FIG. 3D, the signal A1 is less than the signal A2 and the phases of signals A1 and A2 are aligned. Since signal A2 has a greater magnitude than signal A1, the AM modulated index m of signal A2 is not completely canceled out by the AM modulated index −m of signal A1, and therefore, it is determined that the magnitude of signal A2 is greater than signal A1. This would result in the system 10 biasing the output towards the signal A2. By contrast, FIG. 3E depicts a vector diagram in which the signal A1 has a greater magnitude than the signal A2 and the phases of A1 and A2 are aligned. Thus, the AM modulated index of −m of signal A1 is not completely canceled out by the AM modulated index m of signal A2, resulting in a portion of the AM modulated index −m of signal A1 remaining. Since the signal A1 has a greater magnitude than the A2 signal, and the system 10 biases the output towards the signal A1. When A1≠A2, the signals have different magnitudes, and thus have different amplitudes, and when the signals are summed, the AM modulations (m and −m) will result in one of the AM modulations being canceled out and a portion of the other AM modulation remaining. Thus, the signal where a portion of the AM modulation remains is determined to be the stronger signal or have the greater magnitude. It should be appreciated that any AM modulation index (m and −m) can be used so long as m and −m are substantially 180 degrees apart so that the AM modulation indexes will cancel out one another.

In reference to FIGS. 1-2B and 4, a method for receiving signals in the stereo receiving system 10 is generally shown at 50. The method 50 starts at step 52 and then proceeds to step 54, where the antennas 12, 14 receive the RF signals. Next, at step 56, the signals are amplitude modulated by the first and second AM modulators 24,26. The method 50 then proceeds to step 58, where the signal from the first antenna 12 is summed with the AM modulated signal from the second antenna 14 by the first summing device 20. Next, at step 60, the signals from the second antenna 14 are summed with the AM modulated signal from the first antenna 14 by the second summing device 22.

The method 50 then proceeds to step 62, where the potentiometer device 28 receives the summed signals and biases an output toward the signal with the greater magnitude. Next, the output of the potentiometer device 28 is received and demodulated by a receiving device 16. The receiving device 16 demodulates both the AM information and the FM information present on the output of the potentiometer device 28, and emits an output based upon the received signal at step 64. At decision step 66, the AM information is provided in the AM detector output, and the method 50 proceeds to step 68, where the AM detector output is multiplied by a perturbation frequency signal from the phase lock loop device 46. After that, a loop for gain-control is completed at step 70 that includes the synchronous detector 32 and the gain-control integrator 36, and the method 50 then proceeds to step 72, where the method 50 ends. At decision step 66, the FM information is provided in the FM detector output, and the method 50 proceeds to step 74, where the FM detector output is multiplied by a perturbation frequency from the phase lock loop device 46. After step 74, the method 50 proceeds to step 76, where a loop is completed for phase alignment of the signals that includes the delay-adjusting device 44, the integrator 44, and the controllable phase shifting device 38, and the method 50 then proceeds to step 72, where the method 50 ends.

Advantageously, by aligning the phases of the signals received by the antennas 12, 14 and controlling the gain of the receiving system 10, the signals received by the antennas 12, 14 can be added while an output of the system 10 is biased towards the signal with the greater magnitude. This results in the stronger or better quality signal having a greater ratio over the weaker signal in the summation of the two signals. Thus, both signals are being used, rather than switching between the signals and only using one of the received signals. Likewise, by biasing the output towards the stronger signal, if the weaker signal contains mostly noise, the biasing of the stronger signal will compensate for the noise, and thus, result in a better signal than if the two signals were added together or if only one of the signals from the antennas 12, 14 were used. Further, the result of the receiving system 10 is a quality output signal that uses all of the signals that were obtained by the plurality of antennas, but does not require the complexity of a maximal-ratio system, which makes for a more efficient and economical system to implement.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A stereo receiving system comprising:

a plurality of antennas for receiving a plurality of radio frequency (RF) signals having a common frequency but potentially different phases;

a receiving device having at least an amplitude modulated (AM) detector output and a frequency modulated (FM) detector output that includes a pilot signal, wherein said receiving device is in electrical communication with said plurality of antennas;

a plurality of summing devices in electrical communication between at least one of said plurality of antennas and said receiving device;

a phase lock loop device in electrical communication with said receiving device, wherein said phase lock loop device locks onto said pilot signal and emits a perturbation frequency signal;

a controllable phase shifter device in electrical communication between at least one of said plurality of antennas and at least one of said plurality of summing devices, wherein said controllable phase shifter device is responsive to at least said FM detector output and shifts the phase of said at least one said plurality of RF signals by an amount sufficient to eliminate a phase error between said plurality of RF signals; and a gain-control device in electrical communication between said plurality of antennas and said receiving device, wherein said gain-control device controls a signal-to-noise ratio of said RF signals aligned from said plurality of antennas.

2. The system of claim 1, wherein said gain-control device further comprises:

at least a first summing device and a second summing device of said plurality of summing devices;

a plurality of AM modulators in electrical communication between said plurality of antennas and said plurality of summing devices;

a synchronous detector that multiplies said perturbation frequency signal to said AM modulated output;

a gain-control integrator that integrates an output from said synchronous detector; and a potentiometer device in electrical communication with said plurality of summing devices that biases an output signal received by said receiving device towards one of said RF signals that has a greater magnitude.

3. The system of claim 2, wherein a first AM modulator of said plurality of AM modulators receives a first RF signal of said plurality of RF signals from a first antenna of said plurality of antennas, and a second AM modulator of said plurality of AM modulators receives a second RF signal of said plurality of RF signals from a second antenna of said plurality of antennas.

4. The system of claim 3, wherein said first summing device receives said first RF signal and an output of said second AM modulator.

5. The system of claim 3, wherein said second summing device receives said second RF signal and an output of said first AM modulator.

6. The system of claim 2, wherein said potentiometer device receives a plurality of outputs from said plurality of summing devices and an output signal is biased towards one of said RF signals with the greater magnitude.

7. The system of claim 2, wherein an output voltage from said integrator is received by said potentiometer device for determining which RF signal said output of said potentiometer device is biasing towards.

8. The system of claim 1 further comprising a delay-adjusting device in electrical communication with said gain-control device, which imparts a delay on said perturbation signal to compensate for a delay of said receiving device.

9. The system of claim 1, wherein said phase lock loop device synchronizes the phase of said perturbation signal with the phase of said pilot signal received from said receiving device.

10. The system of claim 1 further comprising a filter in electrical communication between said gain-control device and said receiving device.

11. A stereo receiving system comprising:

at least a first antenna receiving a first RF signal and a second antenna receiving a second RF signal, wherein said first and second RF signals have a common frequency but potentially different phases;

a receiving device having at least an amplitude modulated (AM) detector output and a frequency modulated (FM) detector output that includes a pilot signal, wherein said receiving device is in electrical communication with said first and second antennas;

at least a first summing device in electrical communication between said first antenna and said receiving device, and a second summing device in electrical communication between said second antenna and said receiving device;

a phase lock loop device in electrical communication with said receiving device, wherein said phase lock loop device locks onto said pilot signal and emits a perturbation frequency signal;

a controllable phase shifter device in electrical communication between said first and second antennas and said first and second summing devices, wherein said controllable phase shifter device is responsive to at least said FM detector output and shifts the phase of at least one said RF signal by an amount sufficient to eliminate a phase error between said RF signals;

at least a first AM modulator in electrical communication between said first antenna and said second summing device, and a second AM modulator in electrical communication between said second antenna and said first summing device;

a synchronous detector in electrical communication with said receiving device that multiplies said perturbation frequency signal to said AM modulator output;

a gain-control integrator that integrates an output from said synchronous detector; and a potentiometer device that receives outputs from said first and second summing devices, and biases an output signal towards one of said RF signals with the greater magnitude to control the signal-to-noise ratio of said RF signals aligned from said first and second antennas.

12. The system of claim 11, wherein said first summing device receives said first RF signal and an output of said second AM modulator.

13. The system of claim 11, wherein said second summing device receives said second RF signal and an output of said first AM modulator.

14. The system of claim 11, wherein an output voltage from said integrator is received by said potentiometer device for determining which RF signal an output of said potentiometer device is biasing towards.

15. The system of claim 11 further comprising a delay-adjusting device in electrical communication with said gain-control device, which imparts a delay on said perturbation frequency signal to compensate for a delay of said receiving device.

16. The system of claim 11, wherein said phase lock loop device synchronizes the phase of said perturbation frequency signal with the phase of said pilot signal received from said receiving device.

17. A method of receiving a signal by a stereo receiving system comprising the steps of:

receiving a plurality of RF signals by a plurality of antennas;

modulating said plurality of RF signals received from said plurality of antennas by a plurality of AM modulators;

summing at least a first RF signal from a plurality of RF signals from a first antenna of said plurality of antennas with an AM modulated signal from a second antenna of said plurality of antennas by one of said plurality of AM modulators;

summing at least a second RF signal from a plurality of RF signals from said second antenna with an AM modulated signal from said first antenna by one of said plurality of AM modulators;

biasing an output of a potentiometer device towards one of said plurality of RF signals with the greater magnitude;

receiving the biased output of the potentiometer device by a receiving device, wherein said receiving device has at least an AM detector output and an FM detector output that includes a pilot signal;

locking onto said pilot signal by a phase lock loop device, wherein said phase lock loop device provides a perturbation frequency signal;

multiplying said AM detector output and said perturbation frequency signal; and completing a loop to said potentiometer device for controlling the gain and signal-to-noise ratio of said RF signals.

18. The method of claim 17 further comprising the step of providing a gain-control integrator that integrates the multiplied AM detector output and a perturbation frequency signal, and transmits an output to said potentiometer device.

19. The method of claim 17 further comprising the step of said phase lock loop device synchronizing the phase of said perturbation signal with a phase of said pilot signal received by said receiving device.

20. The method of claim 17 further comprising the step of providing a delay-adjusting device, which imparts a delay on a perturbation signal to compensate for a delay of said receiving device.

* * * * *